United States Patent
Kwon et al.

(10) Patent No.: US 10,899,962 B2
(45) Date of Patent: Jan. 26, 2021

(54) CAMERA MODULE, LUBRICANT COMPOSITION, AND ELECTRONIC DEVICE

(71) Applicant: Samsung Electro-Mechanics Co., Ltd., Suwon-si (KR)

(72) Inventors: Sang Hyun Kwon, Suwon-si (KR); Hye Lee Kim, Suwon-si (KR); Seong Chan Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/458,394

(22) Filed: Jul. 1, 2019

(65) Prior Publication Data
US 2020/0131434 A1 Apr. 30, 2020

(30) Foreign Application Priority Data
Oct. 31, 2018 (KR) .................. 10-2018-0131696

(51) Int. Cl.
*C09K 11/02* (2006.01)
*C09K 11/06* (2006.01)
(Continued)

(52) U.S. Cl.
CPC ............ *C09K 11/025* (2013.01); *C09K 11/06* (2013.01); *C10M 141/12* (2013.01); *C10M 169/00* (2013.01); *G02B 7/02* (2013.01); *H04N 5/2254* (2013.01); *H04N 5/23293* (2013.01); *C09K 2211/1007* (2013.01);
(Continued)

(58) Field of Classification Search
CPC ............... C09K 11/025; C09K 11/06; C09K 2211/1007; C09K 2211/1018; C10M 105/78; C10M 141/12; C10M 169/00; C10M 2207/025; C10M 2211/0425; C10M 2213/0606; C10M 2215/067; C10M 2215/30; C10M 2227/00; C10N 2030/20; C10N 2040/06; C10N 2040/42; G02B 7/02; G02B 7/08; G02B 27/646; H04N 5/2251
See application file for complete search history.

(56) References Cited

U.S. PATENT DOCUMENTS 7,754,665 B2 7/2010 Tsuzaki et al.
9,644,168 B2 5/2017 Matsumoto et al.
(Continued)

FOREIGN PATENT DOCUMENTS

CN 1662634 A 8/2005
CN 1878850 A 12/2006
(Continued)

OTHER PUBLICATIONS

Chinese Office Action dated Nov. 23, 2020 in counterpart Chinese Patent Application No. 20190967912.9 (3 pages in English and 6 pages in Chinese).

*Primary Examiner* — James C Goloboy
(74) *Attorney, Agent, or Firm* — NSIP Law

(57) ABSTRACT

A camera module includes a lens module including a lens, and a base module configured to accommodate the lens module therein. A fluorinated lubricant is disposed on a portion of at least one of the lens module and the base module, the fluorinated lubricant includes a fluorescent material capable of emitting fluorescent light when illuminated with ultraviolet (UV) light.

18 Claims, 8 Drawing Sheets

(51) Int. Cl.
  *C10M 141/12* (2006.01)
  *C10M 169/00* (2006.01)
  *H04N 5/232* (2006.01)
  *H04N 5/225* (2006.01)
  *G02B 7/02* (2006.01)
  *C10N 30/20* (2006.01)
  *C10N 40/06* (2006.01)

(52) U.S. Cl.
  CPC ........... *C09K 2211/1018* (2013.01); *C10M 2211/0425* (2013.01); *C10M 2213/0606* (2013.01); *C10M 2215/067* (2013.01); *C10M 2215/30* (2013.01); *C10M 2227/00* (2013.01); *C10N 2030/20* (2013.01); *C10N 2040/06* (2013.01)

(56) References Cited

U.S. PATENT DOCUMENTS

| | | | |
|---|---|---|---|
| 10,197,763 B2 | 2/2019 | Cheong et al. | |
| 2005/0090408 A1* | 4/2005 | Burns | C10M 107/38 508/270 |
| 2005/0107271 A1* | 5/2005 | Tsuzaki | C10M 105/52 508/590 |
| 2005/0145822 A1 | 7/2005 | Drigotas et al. | |
| 2006/0132968 A1 | 6/2006 | Kobayashi et al. | |
| 2006/0163532 A1 | 7/2006 | D'Aprile et al. | |
| 2015/0038381 A1* | 2/2015 | Matsumoto | C10M 171/007 508/261 |
| 2016/0353004 A1* | 12/2016 | Cheong | G02B 7/09 |

FOREIGN PATENT DOCUMENTS

| CN | 104169408 A | 11/2014 |
|---|---|---|
| CN | 106200211 A | 12/2016 |
| JP | 2006-188693 A | 7/2006 |
| JP | 4362779 B2 | 11/2009 |
| JP | 5097405 B2 | 12/2012 |
| KR | 10-2014-0139517 A | 12/2014 |

* cited by examiner

CAMERA MODULE, LUBRICANT COMPOSITION, AND ELECTRONIC DEVICE

CROSS-REFERENCE TO RELATED APPLICATIONS

This application claims the benefit under 25 U.S.C. 119(a) of Korean Patent Application No. 10-2018-0131696 filed on Oct. 31, 2018, in the Korean Intellectual Property Office, the entire disclosure of which is incorporated herein by reference for all purposes.

BACKGROUND

1. Field

The following description relates to a camera module, a lubricant composition, and an electronic device.

2. Description of the Background

A camera module contains various moving bodies therein for movement of a lens module and the like. To reduce friction between these moving bodies, lubricants, such as oil and grease, are typically used. There has been research and development underway for novel processes and materials to improve applications and maintenance of such lubricants, which may be key factors in the process of manufacturing a camera module.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module including a lens, and a base module configured to accommodate the lens module therein, wherein a fluorinated lubricant is disposed on a portion of at least one of the lens module and the base module, the fluorinated lubricant including a fluorescent material capable of emitting fluorescent light when illuminated with ultraviolet (UV) light.

The fluorescent material may include at least one of a compound represented by Chemical Formula 1 and a compound represented by Chemical Formula 2:

[Chemical Formula 1]

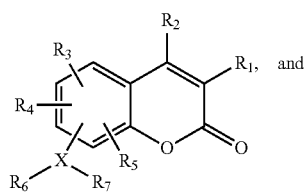

-continued

[Chemical Formula 2]

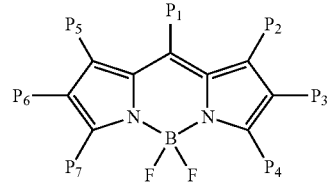

wherein in Chemical Formula 1, X may be O or N, $R_1$ to $R_5$ may each be independently hydrogen or a $C_1$-$C_5$ alkyl group, and $R_6$ and $R_7$ may each be independently a $C_1$-$C_5$ alkyl group, and wherein in Chemical Formula 2, $P_1$ may be a $C_6$-$C_{12}$ aryl group, and $P_2$ to $P_7$ may each be independently hydrogen or a $C_1$-$C_5$ alkyl group.

The fluorescent material may include at least one of a compound represented by Chemical Formula 1-1 and a compound represented by Chemical Formula 2-1:

[Chemical Formula 1-1]

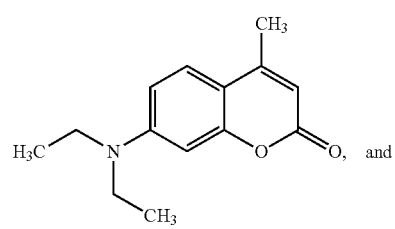

[Chemical Formula 2-1]

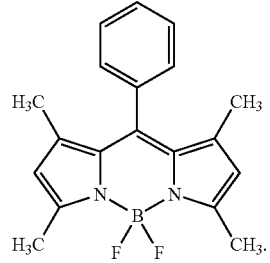

The fluorinated lubricant may include a perfluoropolyether (PFPE)-based oil having a repeat unit represented by Chemical Formula 3:

[Chemical Formula 3]

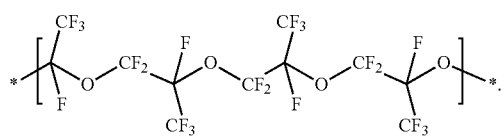

The base module may include a ball member configured to guide movement of the lens module, and the fluorinated lubricant may be disposed on a region of at least one of the lens module and the base module, the region being in contact with the ball member.

An aperture stop module may be coupled to the lens module, wherein the fluorinated lubricant may be disposed on at least a portion of the aperture stop module.

An electronic device may include the camera module further including an image sensor configured to convert light incident through the lens disposed in the lens module to an electrical signal, and a display unit disposed on a surface of the electronic device to display an image based on the electrical signal.

In another general aspect, a camera module includes a lens module including a lens, a base module configured to accommodate the lens module therein, and an aperture stop module coupled to the lens module, wherein a fluorinated lubricant is disposed on at least a portion of the aperture stop module, the fluorinated lubricant including a fluorescent material capable of emitting fluorescent light when illuminated with ultraviolet (UV) light.

The aperture stop module may include a base, at least one plate coupled to the base and including a through-hole, an aperture stop driving unit configured to move the at least one plate, and a ball member configured to guide movement of the aperture stop module, and the fluorinated lubricant may be disposed on a region of at least one of the base and the aperture stop driving unit, the region being in contact with the ball member.

In another general aspect, a lubricant composition includes a fluorinated lubricating material, a solvent; and a fluorinated fluorescent material including at least one of a compound represented by Chemical Formula 1 and a compound represented by Chemical Formula 2.

The fluorinated fluorescent material may include at least one of a compound represented by Chemical Formula 1-1 and a compound represented by Chemical Formula 2-1.

The fluorinated lubricating material may include a perfluoropolyether (PFPE)-based oil having a repeat unit represented by Chemical Formula 3, and the solvent may include a hydrofluoroether (HFE)-based solvent represented by Chemical Formula 4:

[Chemical Formula 4]

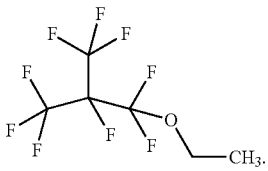

The fluorinated fluorescent material may be included in an amount from 0.01 wt % to less than 1 wt % with respect to a total weight of the lubricant composition.

The camera module may be an electronic device further including an image sensor configured to convert light incident through the lens disposed in the lens module to an electrical signal, and a display unit disposed on a surface of the electronic device to display an image based on the electrical signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
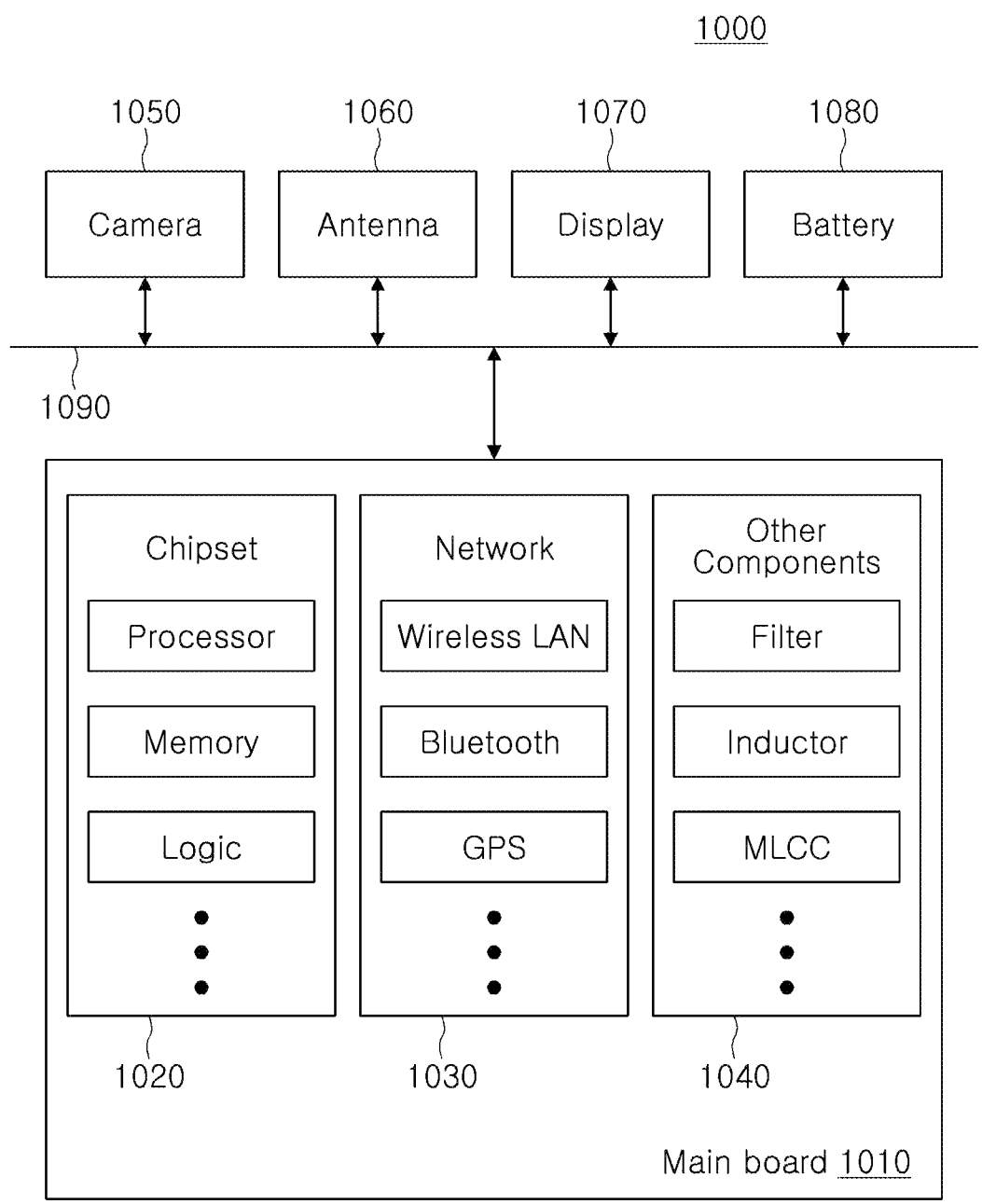
FIG. 1 is a schematic block diagram illustrating an example of an electronic device system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Also, when one element is "electrically connected to" another element, they may be physically connected to each other, or they may be not in physical contact with each other.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

One or more examples of a camera module in which the presence of a lubricant can be easily detected, a lubricant composition used for the same, and an electronic device including a camera module in which the presence of a lubricant can be easily detected are described.

In one or more examples described herein, a fluorinated lubricant containing a fluorescent material capable of emitting fluorescent light when illuminated with UV light may be applied to regions inside a camera module that are subject to friction due to movement of moving bodies therein.

Electronic Device

FIG. 1 is a schematic block diagram illustrating an example of an electronic device system.

Referring to FIG. 1, an electronic device 1000 may accommodate a mainboard 1010 therein. The mainboard 1010 may include chip related components 1020, network related components 1030, other components 1040, and the like, physically or electrically connected thereto. These components may be connected to others to be described below to form various signal lines 1090.

The chip related components 1020 may include a memory chip such as a volatile memory (for example, a dynamic random access memory (DRAM)), a non-volatile memory (for example, a read only memory (ROM)), a flash memory, or the like; an application processor chip such as a central processor (for example, a central processing unit (CPU)), a graphics processor (for example, a graphics processing unit (GPU)), a digital signal processor, a cryptographic processor, a microprocessor, a microcontroller, or the like; and a logic chip such as an analog-to-digital (ADC) converter, an application-specific integrated circuit (ASIC), or the like. However, the chip related components 1020 are not limited thereto, but may also include other types of chip related components. In addition, the chip related components 1020 may be combined with each other.

The network related components 1030 may include protocols such as wireless fidelity (Wi-Fi) (Institute of Electrical And Electronics Engineers (IEEE) 802.11 family, or the like), worldwide interoperability for microwave access (WiMAX) (IEEE 802.16 family, or the like), IEEE 802.20, long term evolution (LTE), evolution data only (Ev-DO), high speed packet access+(HSPA+), high speed downlink packet access+(HSDPA+), high speed uplink packet access+ (HSUPA+), enhanced data GSM environment (EDGE), global system for mobile communications (GSM), global positioning system (GPS), general packet radio service (GPRS), code division multiple access (CDMA), time division multiple access (TDMA), digital enhanced cordless telecommunications (DECT), Bluetooth, 3G, 4G, and 5G protocols, and any other wireless and wired protocols, designated after the abovementioned protocols. However, the network related components 1030 are not limited thereto, but may also include a variety of other wireless or wired standards or protocols. In addition, the network related components 1030 may be combined with each other, together with the chip related components 1020 described above.

Other components 1040 may include a high frequency inductor, a ferrite inductor, a power inductor, ferrite beads, a low temperature co-fired ceramic (LTCC), an electromagnetic interference (EMI) filter, a multilayer ceramic capacitor (MLCC), or the like. However, other components 1040 are not limited thereto, but may also include passive components used for various other purposes, or the like. In addition, other components 1040 may be combined with each other, together with the chip related components 1020 and/or the network related components 1030 described above.

Depending on a type of the electronic device 1000, the electronic device 1000 may include other components that may or may not be physically or electrically connected to the mainboard 1010. These other components may include, for example, a camera module 1050, an antenna 1060, a display device 1070, a battery 1080, an audio codec (not illustrated), a video codec (not illustrated), a power amplifier (not illustrated), a compass (not illustrated), an accelerometer (not illustrated), a gyroscope (not illustrated), a speaker (not illustrated), a mass storage unit (for example, a hard disk drive) (not illustrated), a compact disk (CD) drive (not illustrated), a digital versatile disk (DVD) drive (not illustrated), or the like. However, these other components are not limited thereto, but may also include other components used for various purposes depending on a type of electronic device 1000, or the like The electronic device 1000 may be a smartphone, a personal digital assistant (PDA), a digital video camera, a digital still camera, a network system, a computer, a monitor, a tablet PC, a laptop PC, a netbook PC, a television, a video game machine, a smartwatch, an automotive component, or the like. However, the electronic device 1000 is not limited thereto, but may be any other electronic device processing data.

Figure 2:
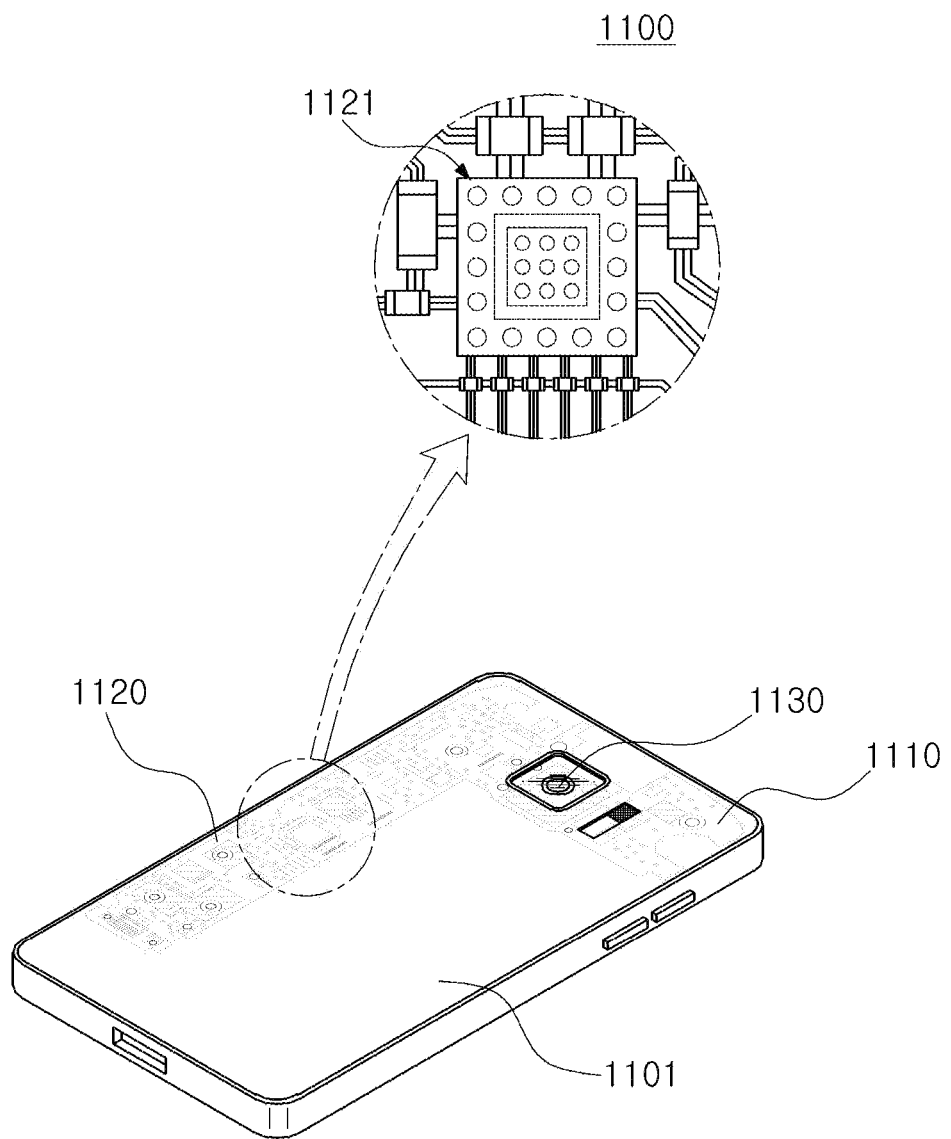
FIG. 2 is a schematic perspective view illustrating an example of an electronic device.

FIG. 2 is a schematic perspective view illustrating an example of an electronic device.

Referring to FIG. 2, a semiconductor package may be used for various purposes in the various electronic devices 1000 as described above. For example, a motherboard 1110 may be accommodated in a body 1101 of a smartphone 1100, and various electronic components 1120 may be physically or electrically connected to the motherboard 1110. In addition, other components that may or may not be physically or electrically connected to the motherboard 1110, such as a camera module 1130, may be accommodated in the body 1101. Some of the electronic components 1120 may be the chip related components, for example, a semiconductor package 1121, but are not limited thereto. The electronic device is not necessarily limited to the smartphone 1100, but may be other electronic devices as described above.

Camera Module

Figure 3:
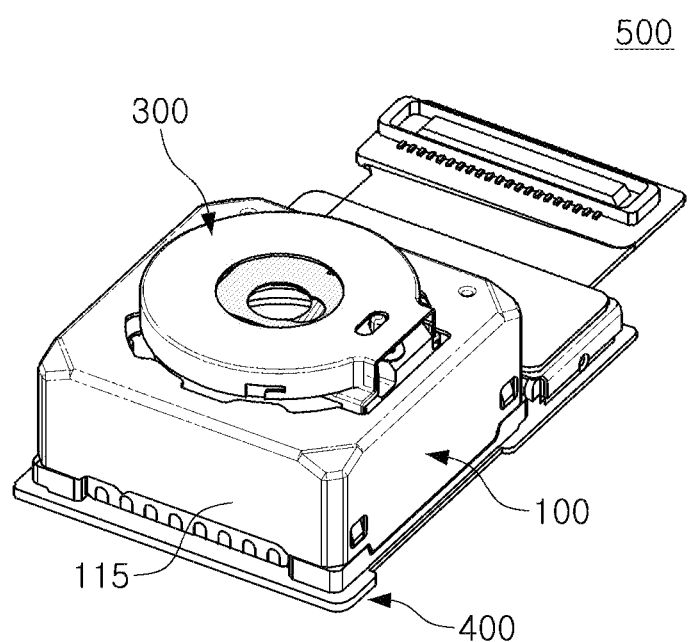
FIG. 3 is a schematic perspective view illustrating an example of a camera module.

FIG. 3 is a perspective view schematically illustrating an example of a camera module.

Figure 4:
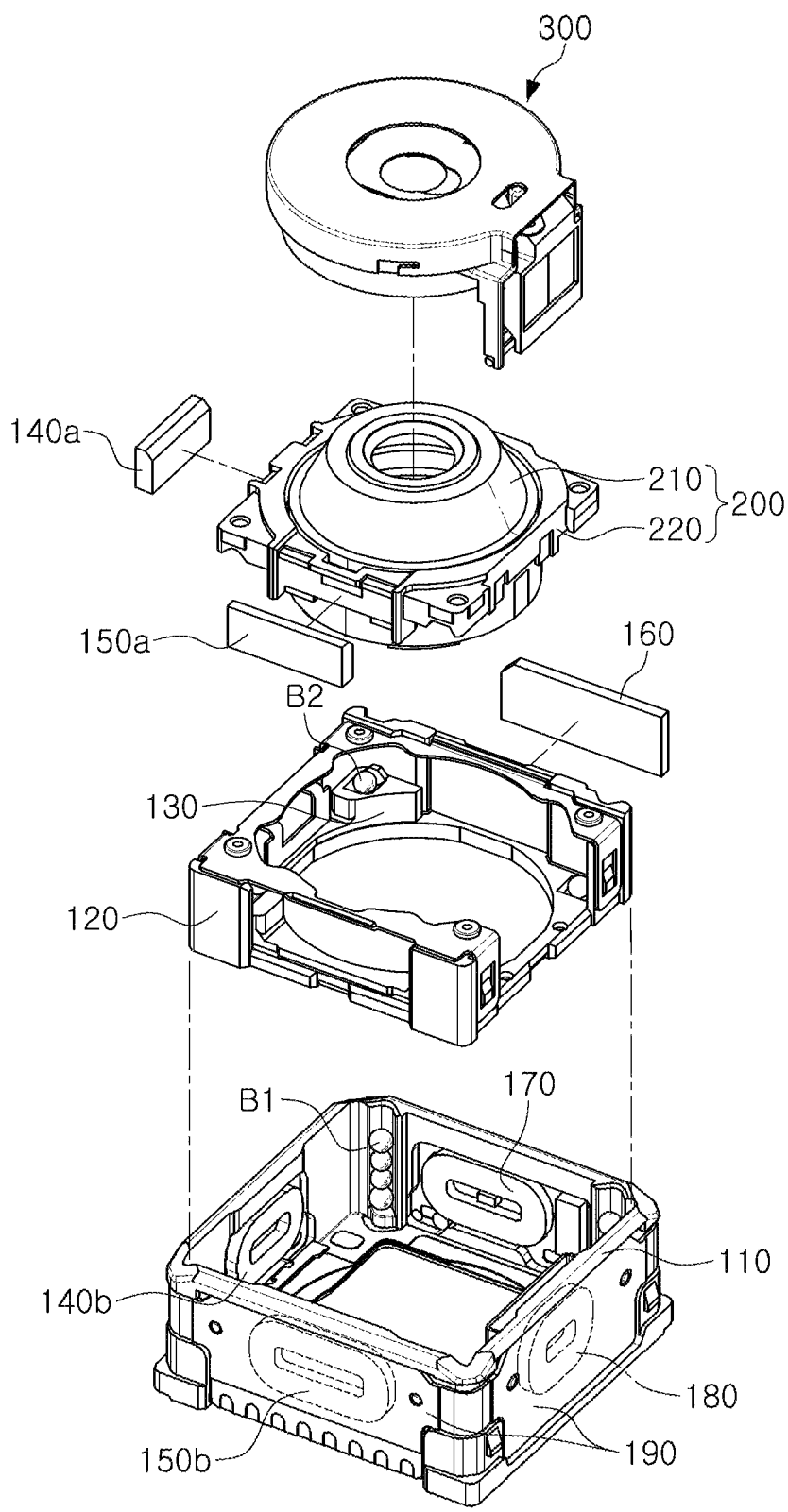
FIG. 4 is an exploded perspective view schematically illustrating example parts of the camera module of FIG. 3.

FIG. 4 is an exploded view schematically illustrating an example camera module of FIG. 3.

Referring to the drawings, a camera module 500 according to an example includes a lens module 200 including a lens, a base module 100 configured to accommodate the lens module 200 therein, an aperture stop module 300 coupled to the lens module 200, and a printed circuit board 400 having the base module 100 mounted thereon.

The lens module 200 may include a lens barrel 210 including a plurality of lenses configured to image a subject, and a holder 220 coupled to the lens barrel 210. The plurality of lenses are disposed inside the lens barrel 210 along an optical axis. The lens module 200 is accommodated within a carrier 120 of the base module 100, which will be described in detail hereinbelow. The lens module 200 is configured to be movable in an optical axis direction for focus adjustment. For example, the lens module 200 can be moved in the optical axis direction together with the carrier 120 by a focusing unit which will be described hereinbelow.

The base module 100 includes a housing configured to accommodate the lens module 200 therein, an actuator configured to move the lens module 200, and ball members configured to guide movement of the lens module 200. More specifically, the base module 100 may include a housing 110, a case 115, the carrier 120, a guide unit 130, an optical image stabilization unit including a plurality of first magnets 140a and 150a and a plurality of first coils 140b and 150b, a focusing unit including a second magnet 160 and a second coil 170, a substrate 190, first ball unit B1, and second ball unit B2. Here, the optical image stabilization unit and the focusing unit may be considered an example configuration of the actuator, and the first and second ball units B1 and B2 may be considered an example configuration of the ball members.

The focusing unit includes the second magnet 160 and a second coil 170, generating a driving force in the optical axis direction. The second magnet 160 is mounted in the carrier 120. For example, the second magnet 160 may be mounted on one surface of the carrier 120. The second coil 170 is mounted in the housing 110. For example, the second coil 170 may be fixed to the housing 110 to face the second magnet 160. The second coil 170 may be provided on the substrate 190, and the substrate 190 may be mounted in the housing 110. The substrate 190 may be disposed on all four surfaces of the housing 110.

The second magnet 160 is a movable member mounted on the carrier 120 and configured to move together with the carrier 120 in the optical axis direction, and the second coil 170 is a stationary member affixed to the housing 110. When power is applied to the second coil 170, the carrier 120 can be moved in the optical axis direction due to an electromagnetic influence between the second magnet 160 and the second coil 170. Since the lens module 200 is accommodated in the carrier 120, by movement of the carrier 120, the lens module 200 is also moved in the optical axis direction together with the carrier 120.

The first ball unit B1 may function to guide the carrier 120 and the lens module 200 during a focusing process. The first ball unit B1 is disposed between the carrier 120 and the housing 110 and configured to reduce friction between the housing 110 and the carrier 120 when the carrier 120 moves. The carrier 120 and the housing 110 may each have a first recess portion in which the first ball unit B1 is disposed, wherein the first recess portions of the carrier 120 and the housing 110 are disposed to face each other. The first ball unit B1 may include one or more balls. The first ball unit B1 is disposed on both sides of the second magnet 160 or the second coil 170. A yoke is mounted on the substrate 190. For example, the yoke is disposed to face the second magnet 160 with the second coil 170 interposed therebetween. Between the yoke and the second magnet 160, an attractive force is generated in a direction perpendicular to the optical axis direction. Therefore, due to the attractive force between the yoke and the second magnet 160, the first ball unit B1 can maintain contact with the carrier 120 and the housing 110. In addition, the yoke serves to condense a magnetic force of the second magnet 160, thus preventing magnetic flux leakage. For example, the yoke and the second magnet 160 form a magnetic circuit.

When a motion occurs during a process of photographing an image, due to user's hand-shake or the like, the optical image stabilization unit is configured to compensate for the motion by providing the lens module 200 with a relative displacement corresponding to the motion. In other words, to correct a blur in the image caused by factors such as user's hand-shake, the lens module 200 may be induced to move in a first direction and a second direction, which are perpendicular to the optical axis. For example, the second direction may be perpendicular to the first direction.

The optical image stabilization unit includes a plurality of first magnets 140a and 150a and a plurality of first coils 140b and 150b to generate a driving force for blur correction. Among the plurality of first magnets 140a and 150a and the plurality of the first coils 140b and 150b, a first magnet 140a and a first coil 140b are disposed to face each other in the first direction and generate a driving force in the first direction, whereas a first magnet 150a and a first coil 150b are disposed to face each other in the second direction and generate a driving force in the second direction.

The plurality of first magnets 140a and 150a are mounted on the lens module 200, the plurality of first coils 140b and 150b, facing the plurality of first magnets 140a and 150a, are affixed to the housing 110. For example, the plurality of first coils 140*b* and 150*b* are each provided in the substrate 190, and the substrate 190 is mounted in the housing 110. The plurality of first magnets 140*a* and 150*a* are movable members configured to move in the first direction and the second direction together with the lens module 200, and the plurality of first coils 140*b* and 150*b* are stationary members affixed to the housing 110 together with the substrate 190.

The carrier 120 has the guide unit 130 accommodated therein. For example, the guide unit 130 and the lens module 200 are inserted in the carrier 120, respectively. The guide unit 130 is configured to guide the lens module 200 when the lens module 200 moves in the first direction and the second direction, which are perpendicular to the optical axis. For example, the guide unit 130 and the lens module 200 may be configured to move together in the first direction within the carrier 120, and the lens module 200 may be configured to move in the second direction relative to the guide unit 130.

The second ball unit B2 functions to guide the guide unit 130 and the lens module 200 during a blur correction process. The second ball unit B2 is disposed between the carrier 120 and the guide unit 130, between the carrier 120 and the lens module 200, and between the guide unit 130 and the lens module 200, respectively, to reduce friction between the carrier 120 and the guide unit 130, between the carrier 120 and the lens module 200, and between the guide unit 130 and the lens module 200, respectively, during the blur correction process. The carrier 120 and the guide unit 130 may each include a second recess portion in which the second ball unit B2 is disposed, wherein the second recess portions of the carrier 120 and the guide unit 130 are disposed to face each other. In addition, the carrier 120 and the lens module 200 may each include a third recess portion in which the second ball unit B2 is disposed, wherein the third recess portions of the carrier 120 and the lens module 200 are disposed to face each other. In addition, the guide unit 130 and the lens module 200 may each include a fourth recess portion in which the second ball unit B2 is disposed, wherein the fourth recess portions of the guide unit 130 and the lens module 200 are disposed to face each other.

When a driving force is generated in the first direction, the second ball unit B2 disposed between the carrier 120 and the guide unit 130 and between the carrier 120 and the lens module 200 are induced to roll in the first direction. Accordingly, the second ball unit B2 serves to guide movement of the guide unit 130 and the lens module 200 in the first direction. Alternatively, when a driving force is generated in the second direction, the second ball unit B2 disposed between the guide unit 130 and the lens module 200 and between the carrier 120 and the lens module 200 are induced to roll in the second direction. Accordingly, the second ball unit B2 serves to guide movements of the lens module 200 in the second direction.

The lens module 200 and the carrier 120 are accommodated inside the housing 110. For example, the housing 110 has an open upper part and an open lower part, and the lens module 200 and the carrier 120 are accommodated into an inner space of the housing 110. Disposed below the housing 110 is a printed circuit board 400 having an image sensor mounted thereon.

The case 115 is coupled to the housing 110 so as to surround an external surface of the housing 110, and functions to protect internal components of the camera module. In addition, the case 115 may function to block electromagnetic waves. For example, the case 115 may serve to protect other internal electronic components inside a mobile electronic device from electromagnetic waves generated by the camera module. In addition, since various electronic components other than the camera module are mounted inside the mobile electronic device, the case 115 may function to block electromagnetic waves generated by these electronic components from affecting the camera module. The case 115 may be made of a metal material and grounded to a grounding pad provided on the printed circuit board 400, to thereby block electromagnetic waves.

Inside the camera module 500 according to an example embodiment, a lubricant may be applied to the first and second ball units B1 and B2 and to the first to fourth recesses in which the first and second ball units B1 and B2 are disposed, to reduce friction between moving bodies therein. Furthermore, the lubricant may be applied to a part of the lens module 200 and/or the base module 100 other than the aforementioned parts.

In particular, in one or more examples, a fluorinated lubricant may be applied which contains a fluorescent material emitting fluorescent light when illuminated with ultraviolet (UV) light. In this case, the presence of the lubricant can be confirmed by a non-invasive method. In other words, when a movement failure occurs during a reliability test and the like, it is important to confirm the presence of a lubricant applied and the extent of the lubricant present, and as described in the examples above, the fluorinated lubricant containing a fluorescent material emitting fluorescent light when illuminated with UV light, may be used inside the camera module 500 to provide beneficial effects due to inherent characteristics of a fluorinated lubricant, and to enable the presence of the lubricant applied and the extent of the lubricant present to be confirmed by illumination with UV light. In addition, unlike a lubricant simply containing a pigment added thereto, the fluorinated lubricant can achieve the aforementioned effects even when used in a small amount, and does not give rise to viscosity-related issues nor degrade the outer appearance of a product in which the lubricant is used. Hereinbelow, a lubricant composition according to one or more examples, which is capable of serving as the base material of such a fluorinated lubricant, will be described in greater detail.

Figure 5:
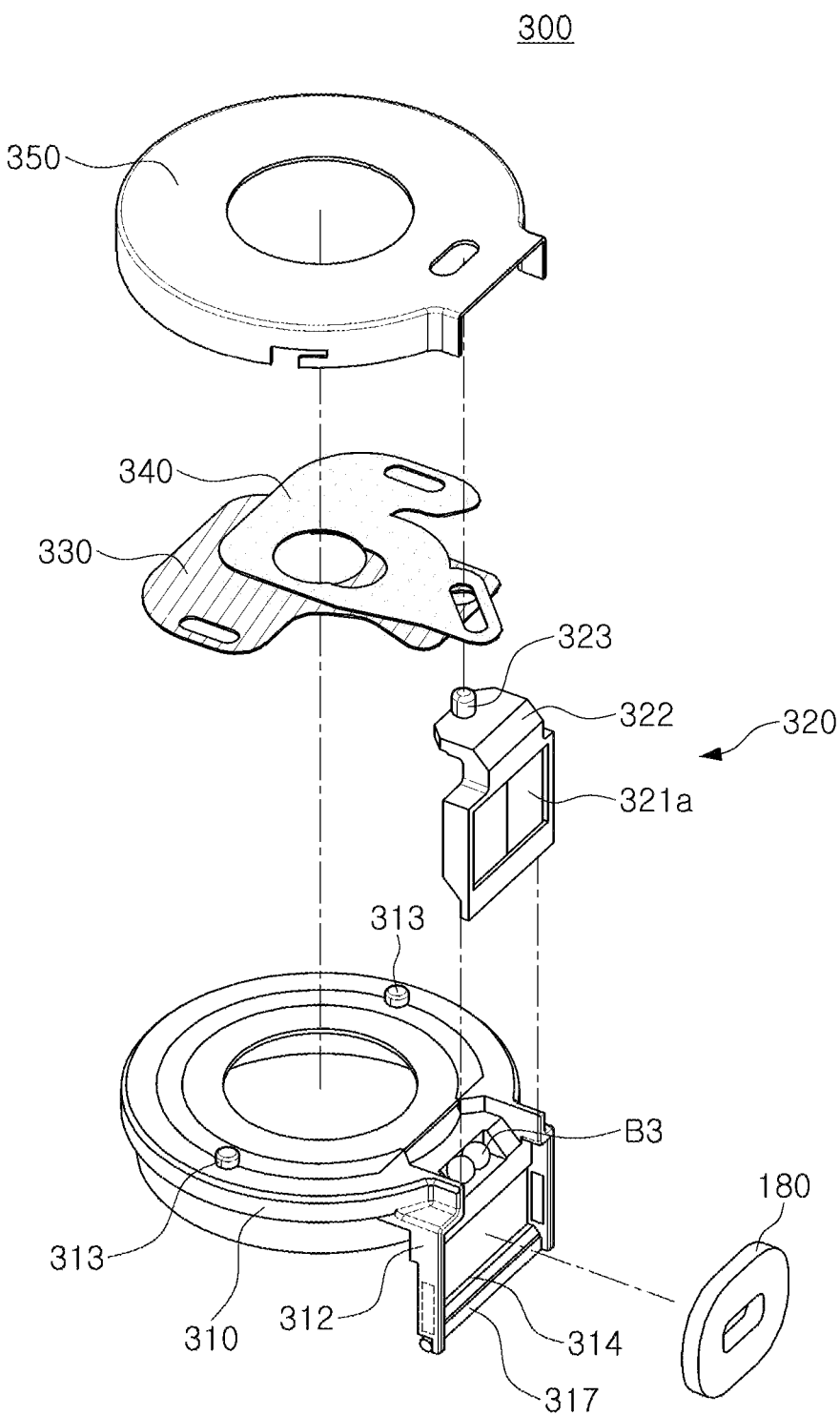
FIG. 5 is an exploded perspective view schematically illustrating an example aperture stop module of FIG. 4.

FIG. 5 is an exploded perspective view schematically illustrating an example aperture stop module of FIG. 4.

Figure 6:
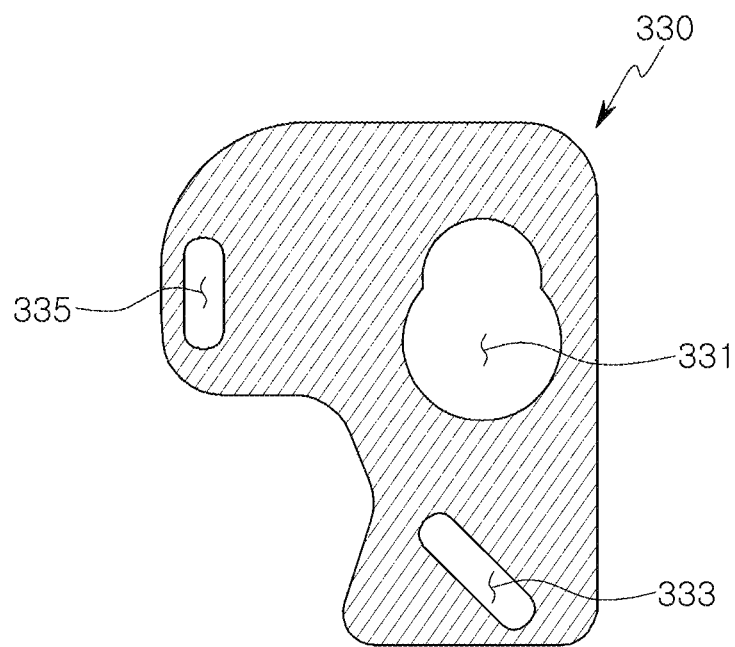
FIG. 6 is a schematic plan view of an example first plate of the aperture stop module of FIG. 5.

FIG. 6 is a schematic plan view of an example first plate of the aperture stop module of FIG. 5.

Figure 7:
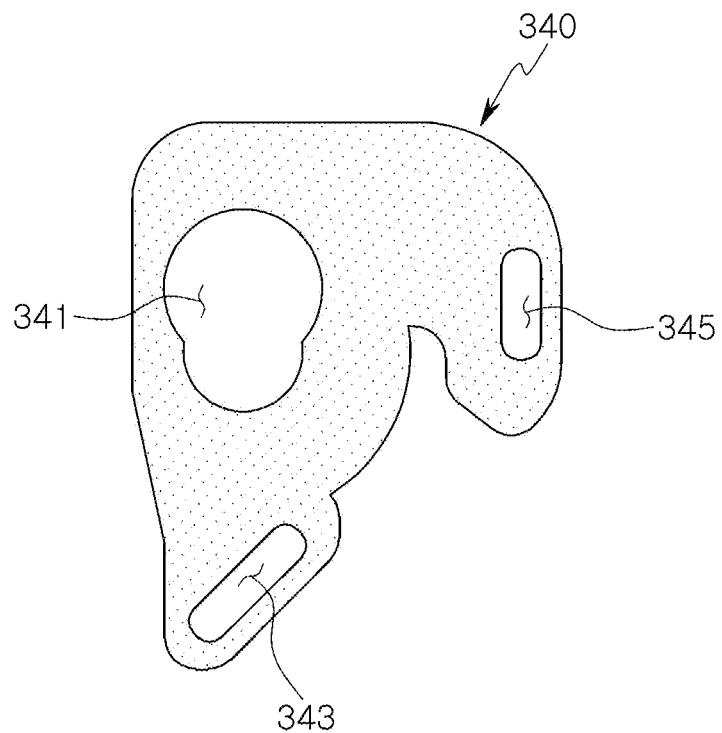
FIG. 7 is a schematic plan view of an example second plate of the aperture stop module of FIG. 5.

FIG. 7 is a schematic plan view of an example second plate of the aperture stop module of FIG. 5.

The aperture stop module 300 is an additional device configured to selectively alter the amount of light entering the lens module 200. For example, the aperture stop module 300 may include a plurality of light-entering holes having different diameters to each other. Depending on an image-capturing environment, light may enter through one of the light-entering holes. The aperture stop module 300 permits a relatively small amount of light to enter the lens module 200 in a high-illumination environment, and permits a relatively large amount of light to enter the lens module 200 in a low-illumination environment, to thereby maintain a uniform quality of image under various illumination conditions.

Referring to the drawings, the aperture stop module 300 is configured to couple to the lens module 200 to selectively alter the amount of light entering the lens module 200. The aperture stop module 300 is configured to couple to the lens module 200 and to move together with the lens module 200 in the optical direction, the first direction, and the second direction. Therefore, the distance between the lens module 200 and the aperture stop module 300 remains unchanged during a focusing process and a blur correction process.

The aperture stop module 300 includes a base 310, a first plate 330, a second plate 340, and an aperture stop driving unit. Furthermore, the base 310 may further include a cover 350 configured to cover the first plate 330 and the second plate 340.

The first plate 330 includes a first through-hole 331, and the second plate 340 includes a second through-hole 341. In addition, the first plate 330 includes a first guide hole 333 and a third guide hole 335, and the second plate 340 includes a second guide hole 343 and a fourth guide hole 345. The first guide hole 333 may be disposed to be inclined with respect to the third guide hole 335, and the second guide hole 343 may be disposed to be inclined with respect to the fourth guide hole 345. The first guide hole 333 and the second guide hole 343 may be inclined in opposite directions from each other.

The first through-hole 331 may have a form in which a plurality of through-holes having different diameters are combined with each other. The first through-hole 331 may have a shape in which a through-hole having a relatively large diameter is combined with a through-hole having a relatively small diameter. For example, the first through-hole 331 may have an overall shape of a gourd. The second through-hole 341 may have a shape in which a plurality of through-holes having different diameters are combined. The second through-hole 341 may have a form in which a through-hole having a relatively large diameter is combined with a through-hole having a relatively small diameter. For example, the second through-hole 341 may have an overall shape of a gourd. Also, the first through-hole 331 and the second through-hole 341 may have an opposite shape to each other.

The first plate 330 and the second plate 340 are coupled to the base 310 such that the first plate 330 and the second plate 340 partially overlap each other in the optical axis direction, and the first plate 330 and the second plate 340 are each configured to be movable by the aperture stop driving unit. For example, the first plate 330 and the second plate 340 may be configured to be capable of linear movement in opposite directions from each other. In addition, the first through-hole 331 and the second through-hole 341 may be configured such that the first through-hole 331 and the second through-hole 341 partially overlap each other in the optical axis direction. The first through-hole 331 and the second through-hole 341 may partially overlap each other in the optical axis direction to form a light-entering hole through which light passes.

The first through-hole 331 and the second through-hole 341 may partially overlap each other to form a plurality of light-entering holes having different diameters from each other. For example, the first through-hole 331 and the second through-hole 341 may partially overlap each other to form a light-entering hole having a relatively large diameter, and the first through-hole 331 and the second through-hole 341 may partially overlap each other to form a light-entering hole having a relatively small diameter. Accordingly, light may be induced to enter one of the plurality of light-entering holes depending on an image-capturing environment.

The aperture stop driving unit includes a magnet unit 320 disposed on the base 310 and configured to be movable along an axis, and a third coil 180 affixed to the housing 110 and disposed to face the magnet unit 320. The third coil 180 is disposed on the substrate 190, and the substrate 190 is affixed to the housing 110. The substrate 190 is electrically connected to the printed circuit board 400. The magnet unit 320 is a movable member configured to move together with the base 310 in the optical axis direction, the first direction, and the second direction, and the coil 180 is a stationary member affixed to the housing 110.

Since the third coil 180 configured to provide a driving force to the aperture stop module 300 is disposed on an external side of the aperture stop module 300, that is, on the housing 110 of the camera module, the weight of the aperture stop module 300 may be reduced. In other words, since the third coil 180 providing a driving force to the aperture stop module 300 is provided as a stationary member, the third coil 180 does not move during an autofocusing process, thus minimizing an increase in weight of the lens module 200 due to the use of the aperture stop module 300. Furthermore, since the third coil 180 providing a driving force to the aperture stop module 300 is disposed in a stationary member, the housing 110, to be electrically connected to the printed circuit board 400, even when the lens module 200 and the aperture stop module 300 move during an autofocusing process and a blur correction process, the third coil 180 of the aperture stop driving unit is not influenced thereby. Therefore, the autofocusing function may be prevented from degradation.

The base 310 includes a protruding part 312 in which the magnet unit 320 is disposed. The protruding part 312 may extend from the base 310 in the optical axis direction. The magnet unit 320 includes a magnet 321a disposed to face the third coil 180, and a magnet holder 322 to which the magnet 321a is attached. The magnet unit 320 is coupled to the protruding unit 312 of the base 310. The protruding part 312 includes a first yoke 314, and by an attractive force between the first yoke 314 and the magnet 321a, the magnet unit 320 and the protruding part 312 are coupled to each other. Here, the first yoke 314 and the magnet 321a may be configured so as avoid contact with each other. To configure the first yoke 314 and the magnet 321a to avoid contact with each other, the base 310 may include a support part configured to support the magnet unit 320.

The support part may include a third ball unit B3, and may further include a guide shaft 317. For example, the base 310 may be provided with the third ball unit B3 as the support part, and may be further provided with the guide shaft 317. The base 310 may be provided with an insertion groove into which the third ball unit B3 is inserted. The third ball unit B3 may be configured to be inserted into the insertion groove, and the third ball unit B3 may be configured to be in point contact with the base 310 and the magnet unit 320.

The protruding part 312 of the base 310 may be provided with the guide shaft 317, and the guide shaft 317 may be configured to be in line contact with the magnet 320. Accordingly, when power is applied to the coil 180, the magnet unit 320 may be induced to move along an axis by an electromagnetic influence between the magnet 321a and the coil 180. The magnet unit 320 may move along an axis while being supported by the third ball unit B3 and the guide shaft 317.

In the drawings, the magnet unit 320 is illustrated such that an upper part of the magnet unit 320 is supported by the third ball unit B3, while a lower part of the magnet unit 320 is supported by the guide shaft 317; however, the magnet unit 320 is not limited thereto. For example, both upper and lower parts of the magnet unit 320 may be supported by the third ball unit B3 or by the guide shaft 317.

The magnet holder 322 includes a first protruding portion 323 configured to penetrate the first plate 330 and the second plate 340. The first protruding portion 323 may be configured to pass through the first guide hole 333 of the first plate 330 and the second guide hole 343 of the second plate 340.

Meanwhile, the first guide hole 333 and the second guide hole 343 may be inclined with respect to a movement direction of the magnet unit 320, and the first guide hole 333 and the second guide hole 343 may be inclined in opposite directions from each other. Accordingly, when the magnet unit 320 moves along an axis, the first protruding portion 323 may move within the first guide hole 333, and by movement of the first protruding portion 323, the first plate 330 may be induced to move toward the magnet unit 320 or further away from the magnet unit 320.

Also, when the magnet unit 320 moves along an axis, the first protruding portion 323 may move within the second guide hole 343, and by movement of the first protruding portion 323, the second plate 340 may be induced to move away from the magnet unit 320 or toward the magnet unit 320. Here, movement directions of the first plate 330 and the second plate 340 may be perpendicular to a movement direction of the magnet unit 320.

Also, the base 310 may include a second protruding portion 313 configured to be inserted into the third guide hole 335 of the first plate 330 and the fourth guide hole 345 of the second plate 340. Each of the third guide hole 335 and the fourth guide hole 345 has a length in a direction perpendicular to a movement direction of the magnet unit 320. The first plate 330 and the second plate 340 may move while being guided by the second protruding portion 313 inserted in the third guide hole 335 and the fourth guide hole 345, respectively. The first plate 330 may be restricted from rotating by the second protruding portion 313 and the third guide hole 335. Also, the second plate 340 may be restricted from rotating by the second protruding portion 313 and the fourth guide hole 345.

Also, a lubricant may be applied to the third ball unit B3 inside the camera module 500 according to one or more examples, and may be further applied to the insertion groove in which the third ball unit B3 is disposed, to reduce friction between the moving bodies thereof. Also, the lubricant may be also applied to areas inside the aperture stop module 300 that are subject to friction. For example, without being limited thereto, the lubricant may be applied to areas of the base 310 and the magnet 320, the areas being in contact with the third ball units B3, or to a contact area between the guide shaft 317 and the magnet unit 320.

In particular, in an example embodiment, the lubricant applied may be a fluorinated lubricant containing a fluorescent material emitting fluorescent light when illuminated with UV light. In this case, it is possible to confirm the presence of the lubricant after application by a non-invasive method. Hereinbelow, a lubricant composition capable of serving as the base material of such a fluorinated lubricant will be described in greater detail.

Lubricant Composition

A lubricant composition according to one or more examples may comprise a fluorinated lubricating material, a solvent, and a fluorinated fluorescent material capable of emitting fluorescent light when illuminated with UV light. Furthermore, the lubricant composition may further comprise additives of various kinds as needed.

The fluorinated lubricating material may be used as an example lubricating material for the purpose of reducing friction between moving bodies inside the camera module 500. For the fluorinated lubricating material, a perfluoropolyether (PFPE)-based oil may be used for example. For example, the PFPE-based oil contains a repeat unit represented by Chemical Formula 3, and this repeat unit may be repeated up to several tens of thousand times. In this case, the fluorinated lubricating material may exhibit a desirable affinity to the solvent, such as a fluorinated solvent, and the fluorinated fluorescent material.

[Chemical Formula 3]

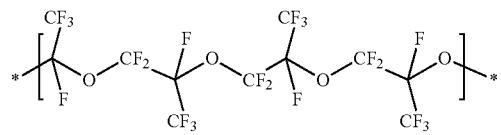

The fluorinated lubricating material may be included in an amount from about 3 wt % to about 50 wt % with respect to a total weight of the lubricant composition. When the fluorinated lubricating material is included in an amount less than 3 wt %, an amount of the lubricant remaining after application may be insufficient, thus causing an undesirable increase of friction between the moving bodies. Alternatively, when the fluorinated lubricating material is contained in an amount greater than 50 wt % with respect to the total weight of the lubricant composition, a remaining amount the lubricant after application may give rise to viscosity-related issues, thus causing an increase in electric current between the moving bodies.

For the solvent, a fluorinated solvent may be used. For example, the fluorinated solvent may be used for dissolving the fluorinated lubricating material and/or the fluorinated fluorescent material. Here, for example, a hydrofluoroether (HFE)-based solvent may be used for the fluorinated solvent. For example, the HFE-based solvent may be a compound represented by the following Chemical Formula 4. In this case, the solvent may exhibit a desirable affinity to the fluorinated lubricating material and/or the fluorinated fluorescent material, and thus can dissolve the fluorinated lubricating material and the fluorinated fluorescent material more easily.

[Chemical Formula 4]

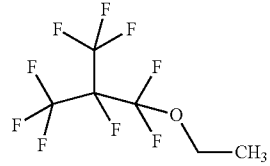

The solvent may be contained in a balance amount after combining the fluorinated lubricating material, the fluorescent material, other additives, and the like, in predetermined ranges with respect to the total weight of the lubricant composition. The solvent may evaporate after the application of the lubricant composition.

The fluorinated fluorescent material is a material having a high affinity to the fluorinated lubricating material and the fluorinated solvent, and which, for example, enables convenient confirmation of the presence of a lubricant, the extent of the lubricant present, and the like. To achieve the aforementioned example effects, the fluorinated fluorescent material, for example, emits fluorescent light when illuminated with UV light. For example, the fluorinated fluorescent material is a material which absorbs energy in the UV range of 310-380 nm, and then when an excited valence electron of the fluorescent material relaxes to its ground state, emits visible light and becomes stable. From this perspective, the fluorinated fluorescent material is, for example, a compound represented by Chemical Formula 1 and/or Chemical Formula 2. In this case, the fluorinated fluorescent material may exhibit a desirable affinity to the aforementioned fluorinated lubricating material, and can be easily dissolved in the aforementioned fluorinated solvent. Also, such a fluorinated fluorescent material can be easily detected by illuminating with UV light.

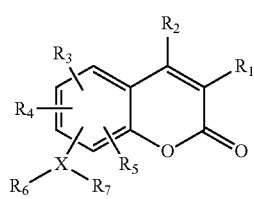

[Chemical Formula 1]

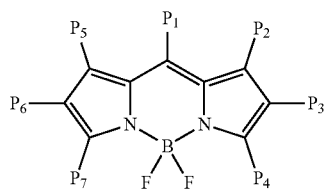

[Chemical Formula 2]

In Chemical Formula 1, X may be 0 or N, $R_1$ to $R_5$ may be each independently hydrogen or a $C_1$-$C_5$ alkyl group, and $R_6$ and $R_7$ may be each independently a $C_1$-$C_5$ alkyl group. Here, the $C_1$-$C_5$ alkyl group may be an aliphatic chain having 1-5 carbon atoms. Also, the aliphatic chain may or may not have a substituent commonly known in the related art. Such a compound represented by Chemical Formula 1 may have an absorption λ max from about 365 nm to about 385 nm, and an emission λ max from about 435 nm to about 455 nm. More specifically, a compound represented by Chemical Formula 1 may be a compound represented by Chemical Formula 1-1. In this case, the compound may exhibit a desirable affinity to PFPE-based oils in particular, and can be easily dissolved in HFE-based solvents in particular.

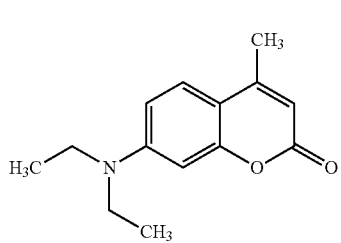

[Chemical Formula 1-1]

In Chemical Formula 2, $P_1$ is a $C_6$-$C_{12}$ aryl group, $P_2$ to $P_7$ are each independently hydrogen or a $C_1$-$C_5$ alkyl group. Here, the $C_6$-$C_{12}$ aryl group means an aromatic ring having 6-12 carbon atoms, and the $C_1$-$C_5$ alkyl group means an aliphatic chain having 1-5 carbon atoms. Also, the aromatic ring and the aliphatic chain each may or may not have a substituent commonly known in the related art. Such a compound represented by Chemical Formula 2 may have an absorption λ max from about 315 nm to about 335 nm, and an emission λ max from about 505 nm to about 525 nm. More specifically, the compound represented by Chemical Formula 2 may be a compound represented by Chemical Formula 2-1. In this case, the compound may have a desirable affinity to PFPE-based oils in particular, and can be easily dissolved in HFE-based solvents in particular.

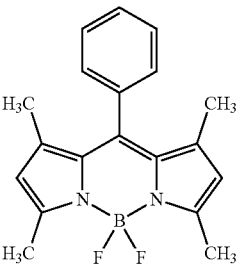

[Chemical Formula 2-1]

The fluorinated fluorescent material may be included in an amount from 0.01 wt % to less than 1 wt % with respect to a total weight of the lubricant composition. When a lubricant composition contains the fluorinated fluorescent material in an amount less than 0.01 wt %, once the lubricant composition is applied, detection of a lubricant may be difficult. Alternatively, when the fluorinated fluorescent material is contained in an amount of 1 wt % or higher, it may give rise to an undesirable liquid separation due to a reduced solubility of the fluorinated fluorescent material.

Figure 8:
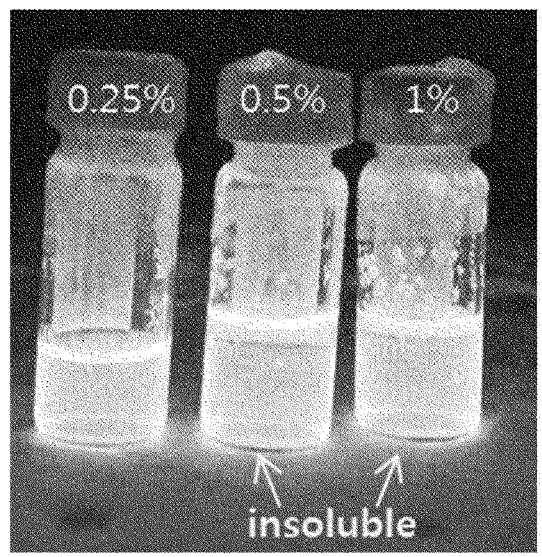
FIG. 8 shows the solubility results associated with varied concentrations of a compound represented by Chemical Formula 1-1.
Figure 9:
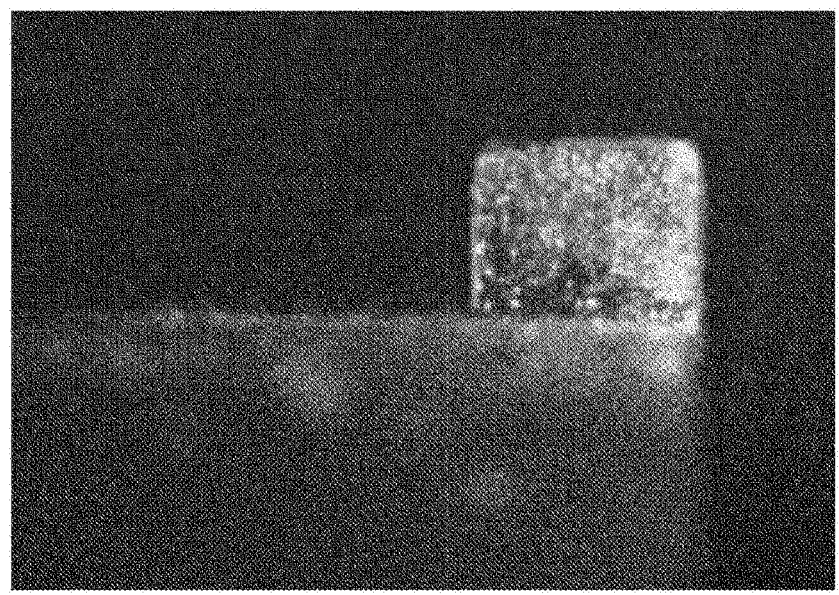
FIG. 9 and FIG. 10 show the coating results associated with varied concentrations of a compound represented by Chemical Formula 1-1 of a lubricant composition.
Figure 10:
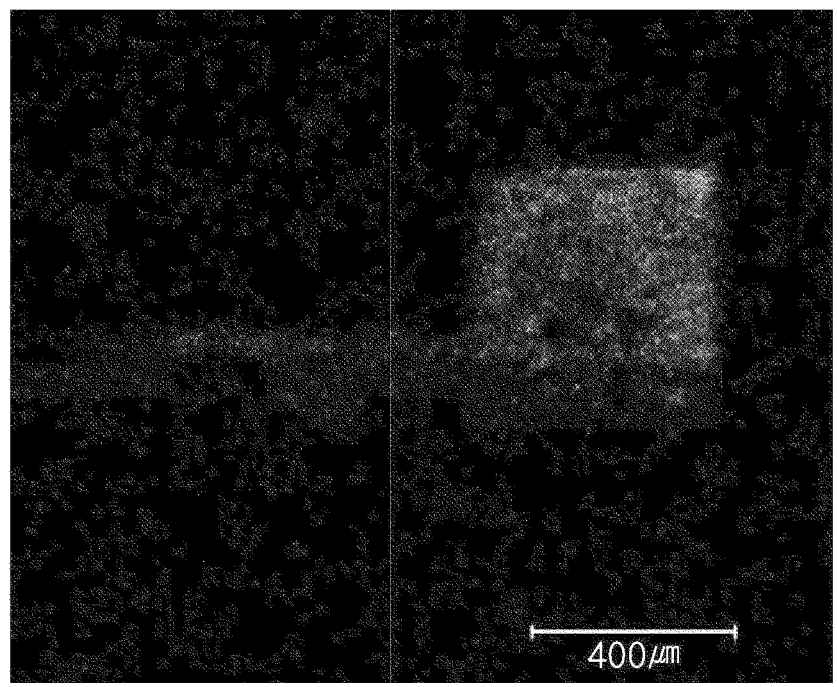

More specifically, when using a compound represented by Chemical Formula 1, for example, a compound represented by Chemical Formula 1-1 for the fluorinated fluorescent material, the fluorinated fluorescent material is included, for example, in an amount from 0.1 wt % to less than 0.5 wt %, or even, for example, in an amount from 0.1 wt % to 0.3 wt %. This can be confirmed from FIG. 8 to FIG. 10. FIG. 8 shows the solubility of a compound represented by Chemical Formula 1-1 in respective concentrations (wt %) shown in the drawings (0.25 wt %, 0.5 wt %, and 1 wt %). Referring to the drawings, it can be seen that solubility issues occur in concentrations of 0.5 wt % or higher. FIG. 9 and FIG. 10 show the fluorescence of a lubricant composition containing 0.25 wt % of a compound represented by Chemical Formula 1-1. FIG. 9 shows the lubricant composition observed with the naked eye, and FIG. 10 shows the lubricant composition observed using a fluorescence microscope. From the drawings, it can be seen that the presence of the lubricant can be easily detected after application of the lubricant composition.

Figure 11:
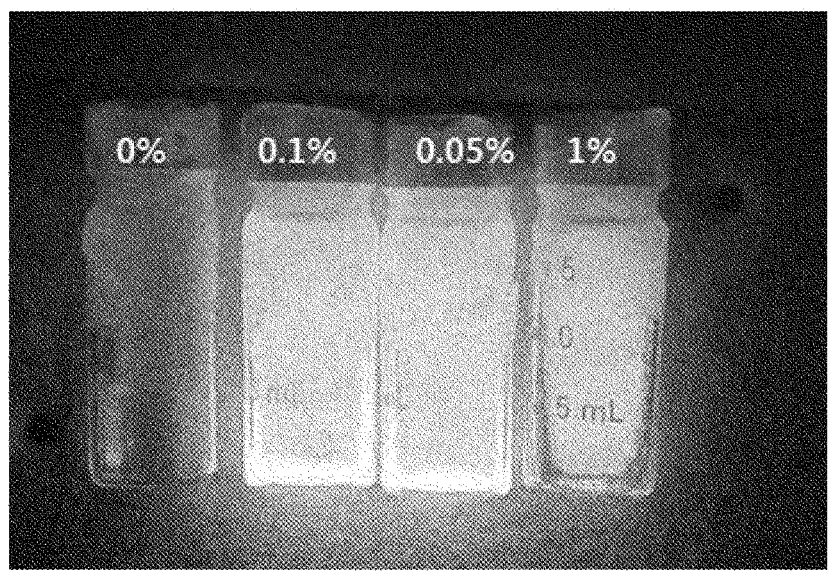
FIG. 11 shows the solubility results associated with varied concentrations of a compound represented by Chemical Formula 2-1.

Furthermore, when using a compound represented by Chemical Formula 2, for example, a compound represented by Chemical Formula 2-1 for the fluorinated fluorescent material, the fluorinated fluorescent material is included, for example, in an amount from 0.01 wt % to less than 1.0 wt %, or even included, for example, in an amount from 0.03 wt % to 0.15 wt %. This can be confirmed from FIG. 11. FIG. 11 shows the solubility of a compound represented by Chemical Formula 2-1 in respective concentrations (wt %) shown in the drawing (0 wt %, 0.1 wt %, 0.05 wt %, and 1 wt %). Referring to the drawing, it can be seen that solubility issues occur in concentrations of 1.0 wt % or higher.

According to the examples described herein, there may be provided a camera module which facilitates confirmation of the presence of a lubricant, a lubricant composition used for the same, and an electronic device including the camera module disposed therein.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a lens module comprising a lens; and
   a base module configured to accommodate the lens module therein, wherein a fluorinated lubricant is disposed on a portion of at least one of the lens module and the base module, the fluorinated lubricant comprising a fluorescent material capable of emitting a fluorescent light when illuminated with ultraviolet (UV) light,
   wherein the fluorescent material comprises a compound represented by Chemical Formula 2:

[Chemical Formula 2]

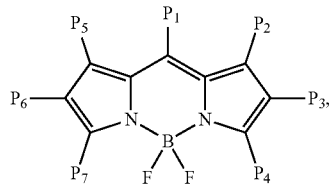

wherein in Chemical Formula 2, $P_1$ is a $C_6$-$C_{12}$ aryl group, and $P_2$ to $P_7$ are each independently hydrogen or a $C_1$-$C_5$ alkyl group.

2. The camera module of claim 1, wherein the fluorescent material comprises compound represented by Chemical Formula 2-1:

[Chemical Formula 2-1]

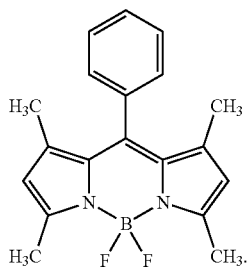

3. The camera module of claim 1, wherein the fluorinated lubricant comprises a perfluoropolyether (PFPE)-based oil having a repeat unit represented by Chemical Formula 3:

[Chemical Formula 3]

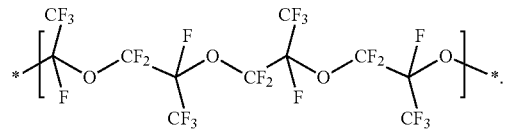

4. The camera module of claim 1, wherein the base module comprises a ball member configured to guide movement of the lens module, and the fluorinated lubricant is disposed on a region of at least one of the lens module and the base module, the region being in contact with the ball member.

5. The camera module of claim 1, further comprising an aperture stop module coupled to the lens module, wherein the fluorinated lubricant is disposed on at least a portion of the aperture stop module.

6. An electronic device, comprising:
   the camera module of claim 1 further comprising an image sensor configured to convert light incident through the lens disposed in the lens module to an electrical signal; and
   a display unit disposed on a surface of the electronic device to display an image based on the electrical signal.

7. A camera module, comprising:
   a lens module comprising a lens;
   a base module configured to accommodate the lens module therein; and
   an aperture stop module coupled to the lens module, wherein a fluorinated lubricant is disposed on at least a portion of the aperture stop module, the fluorinated lubricant comprising a fluorescent material capable of emitting a fluorescent light when illuminated with ultraviolet (UV) light.

8. The camera module of claim 7, wherein the fluorescent material comprises at least one of a compound represented by Chemical Formula 1 and a compound represented by Chemical Formula 2:

[Chemical Formula 1]

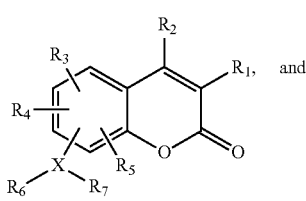
and

[Chemical Formula 2]

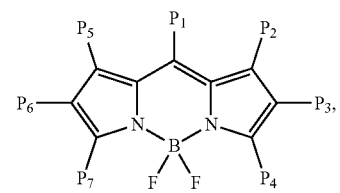

wherein in Chemical Formula 1, X is O or N, $R_1$ to $R_5$ is each independently hydrogen or a $C_1$-$C_5$ alkyl group, and $R_6$ and $R_7$ are each independently a $C_1$-$C_5$ alkyl group, and wherein in Chemical Formula 2, $P_1$ is a $C_6$-$C_{12}$ aryl group, and $P_2$ to $P_7$ are each independently hydrogen or a $C_1$-$C_5$ alkyl group.

9. The camera module of claim 8, wherein the fluorescent material comprises at least one of a compound represented by Chemical Formula 1-1 and a compound represented by Chemical Formula 2-1:

[Chemical Formula 1-1]

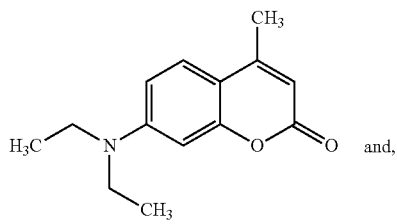

and,

[Chemical Formula 2-1]

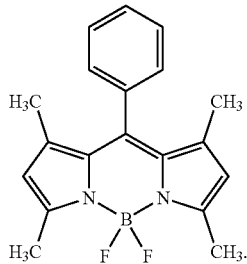

10. The camera module of claim 7, wherein the fluorinated lubricant comprises a perfluoropolyether (PFPE)-based oil having a repeat unit represented by Chemical Formula 3:

[Chemical Formula 3]

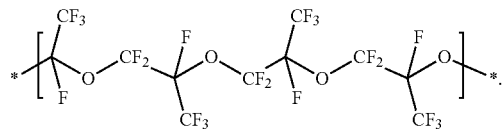

11. The camera module of claim 7, wherein the aperture stop module comprises a base, at least one plate coupled to the base and comprising a through-hole, an aperture stop driving unit configured to move the at least one plate, and a ball member configured to guide movement of the aperture stop module, and wherein the fluorinated lubricant is disposed on a region of at least one of the base and the aperture stop driving unit, the region being in contact with the ball member.

12. An electronic device, comprising:
the camera module of claim 7 further comprising an image sensor configured to convert light incident through the lens disposed in the lens module to an electrical signal; and
a display unit disposed on a surface of the electronic device to display an image based on the electrical signal.

13. A lubricant composition, comprising:
a fluorinated lubricating material;
a solvent; and
a fluorescent material comprising a compound represented by Chemical Formula 2:

[Chemical Formula 2]

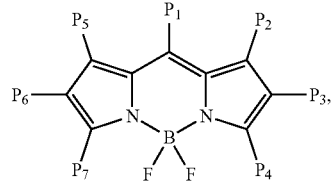

wherein in Chemical Formula 2, $P_1$ is a $C_6$-$C_{12}$ aryl group, and $P_2$ to $P_7$ are each independently hydrogen or a $C_1$-$C_5$ alkyl group.

14. The lubricant composition of claim 13, wherein the fluorescent material comprises a compound represented by Chemical Formula 2-1:

[Chemical Formula 2-1]

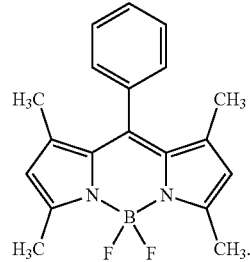

15. The lubricant composition of claim 13, wherein the fluorinated lubricating material comprises a perfluoropolyether (PFPE)-based oil having a repeat unit represented by Chemical Formula 3, and the solvent comprises a hydrofluoroether (HFE)-based solvent represented by Chemical Formula 4:

[Chemical Formula 3]

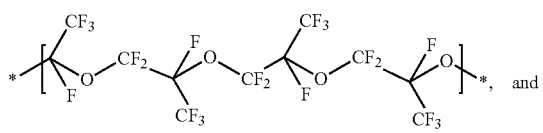, and

[Chemical Formula 4]

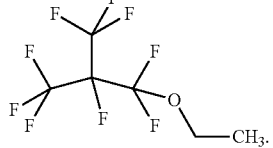

16. The lubricant composition of claim 13, wherein the fluorescent material is included in an amount from 0.01 wt % to less than 1 wt % with respect to a total weight of the lubricant composition.

17. A camera module comprising:
a lens module comprising a lens; and
a base module configured to accommodate the lens module therein, wherein the fluorinated lubricant composition of claim 16 is disposed on a portion of at least one of the lens module and the base module, the fluorinated lubricant emitting a fluorescent light when illuminated with ultraviolet (UV) light.

18. The camera module of claim 17, wherein the camera module is an electronic device further comprising an image sensor configured to convert light incident through the lens disposed in the lens module to an electrical signal, and a display unit disposed on a surface of the electronic device to display an image based on the electrical signal.

* * * * *